Aug. 27, 1929.  E. HARMES  1,726,025
MOLDING MACHINE
Filed April 9, 1927   7 Sheets-Sheet 1

Inventor.
Edward Harmes,
By
Joseph W. Hazell
Attorney

Aug. 27, 1929.                E. HARMES                 1,726,025
                           MOLDING MACHINE
                        Filed April 9, 1927        7 Sheets-Sheet 3

Fig. 3.

Inventor
Edward Harmes
By Joseph W. Hazell
Attorney

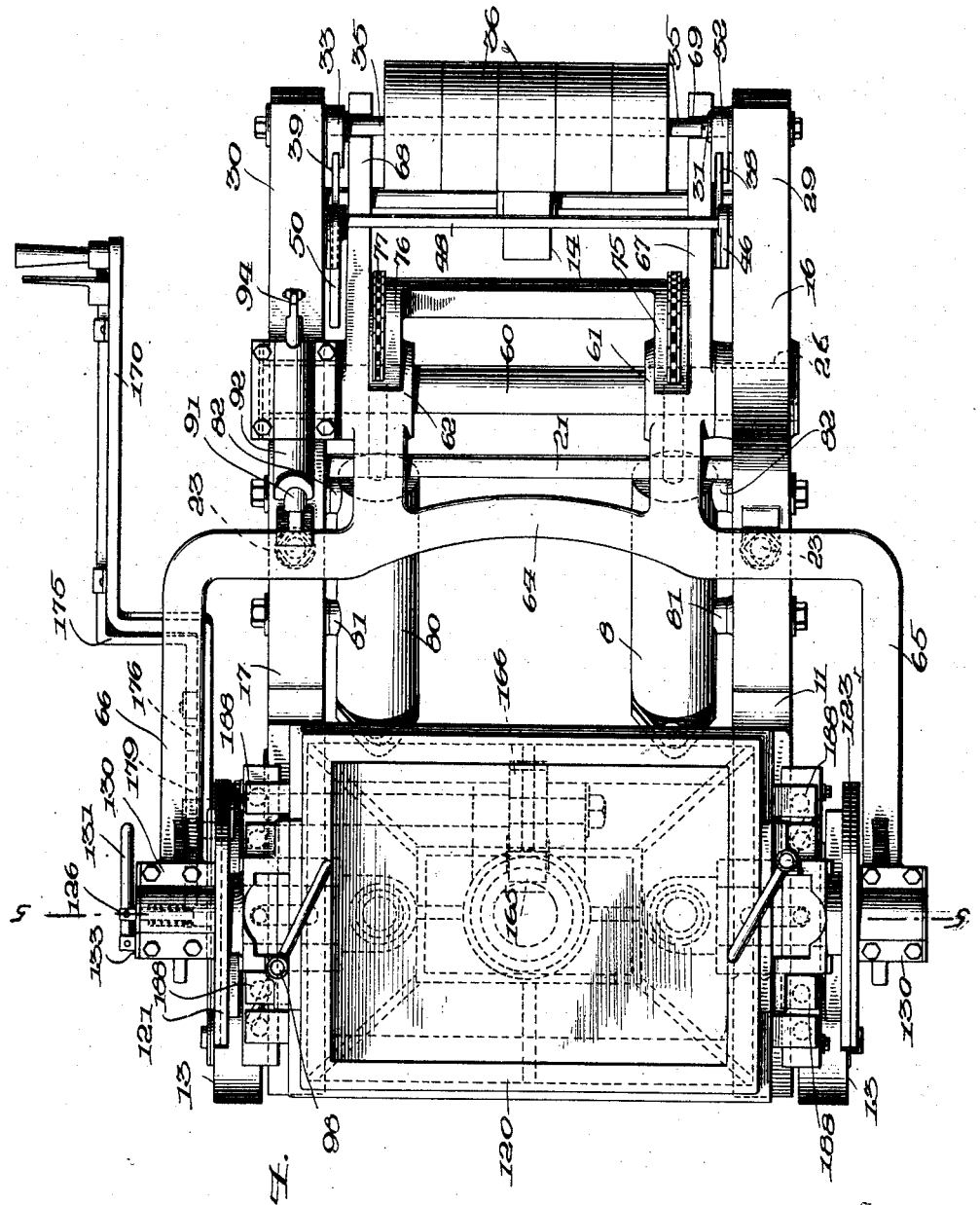

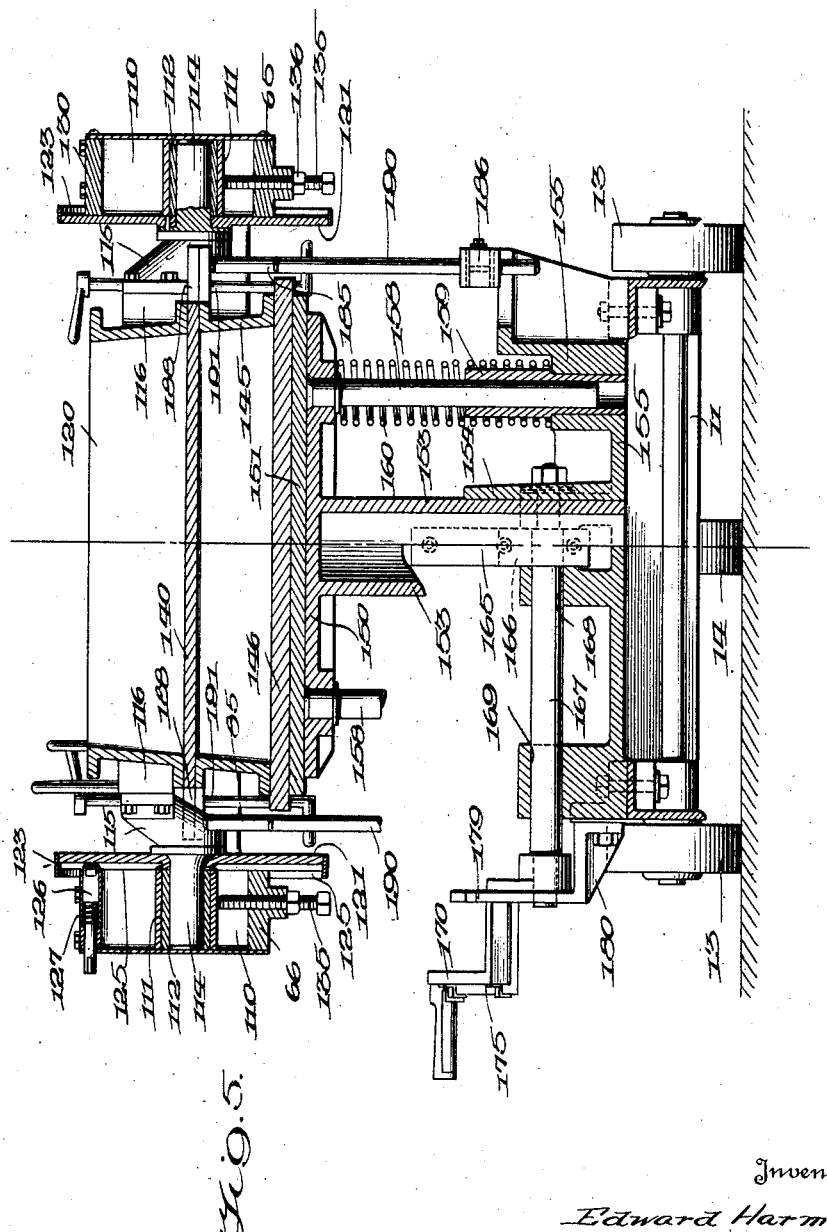

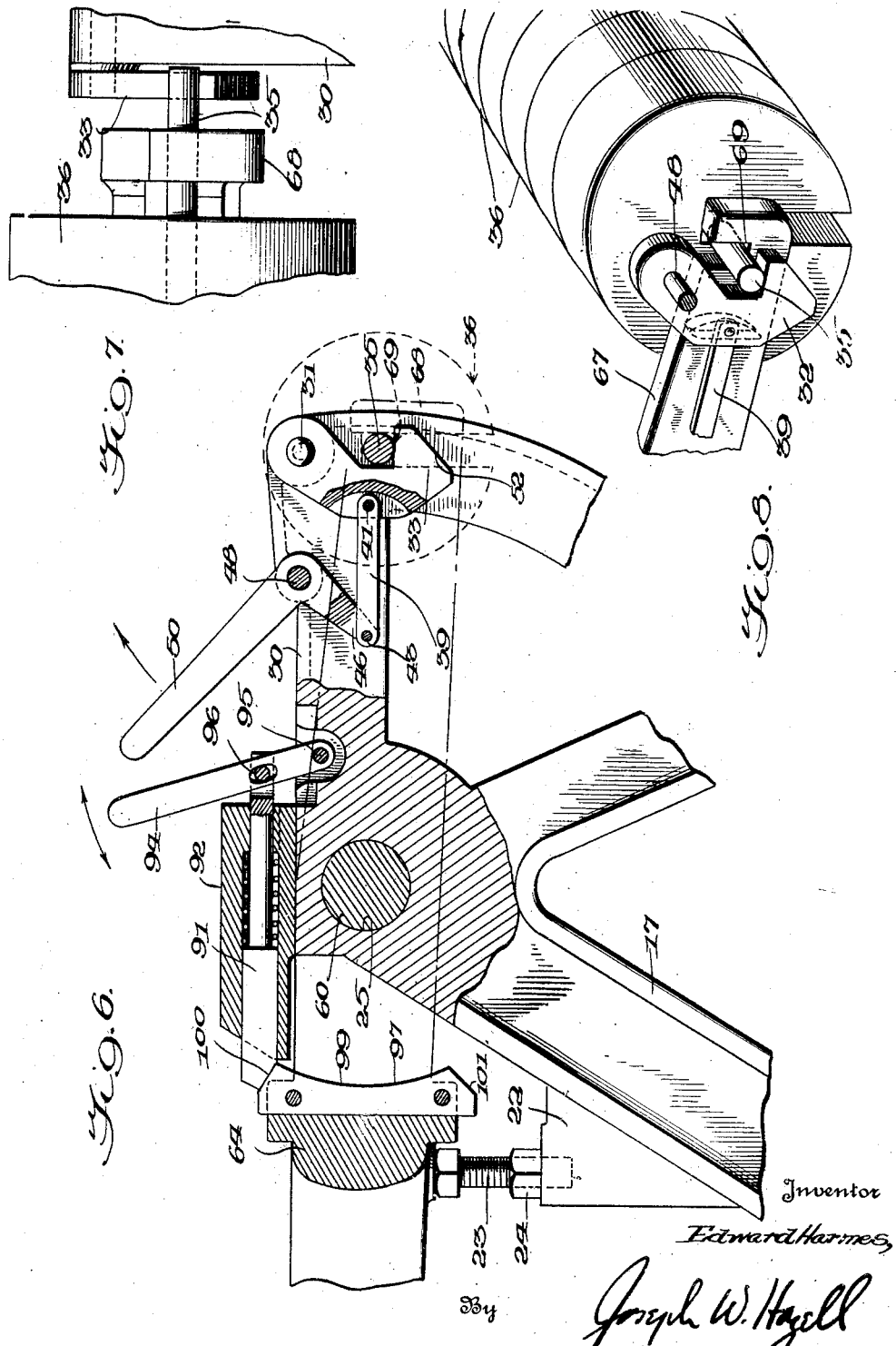

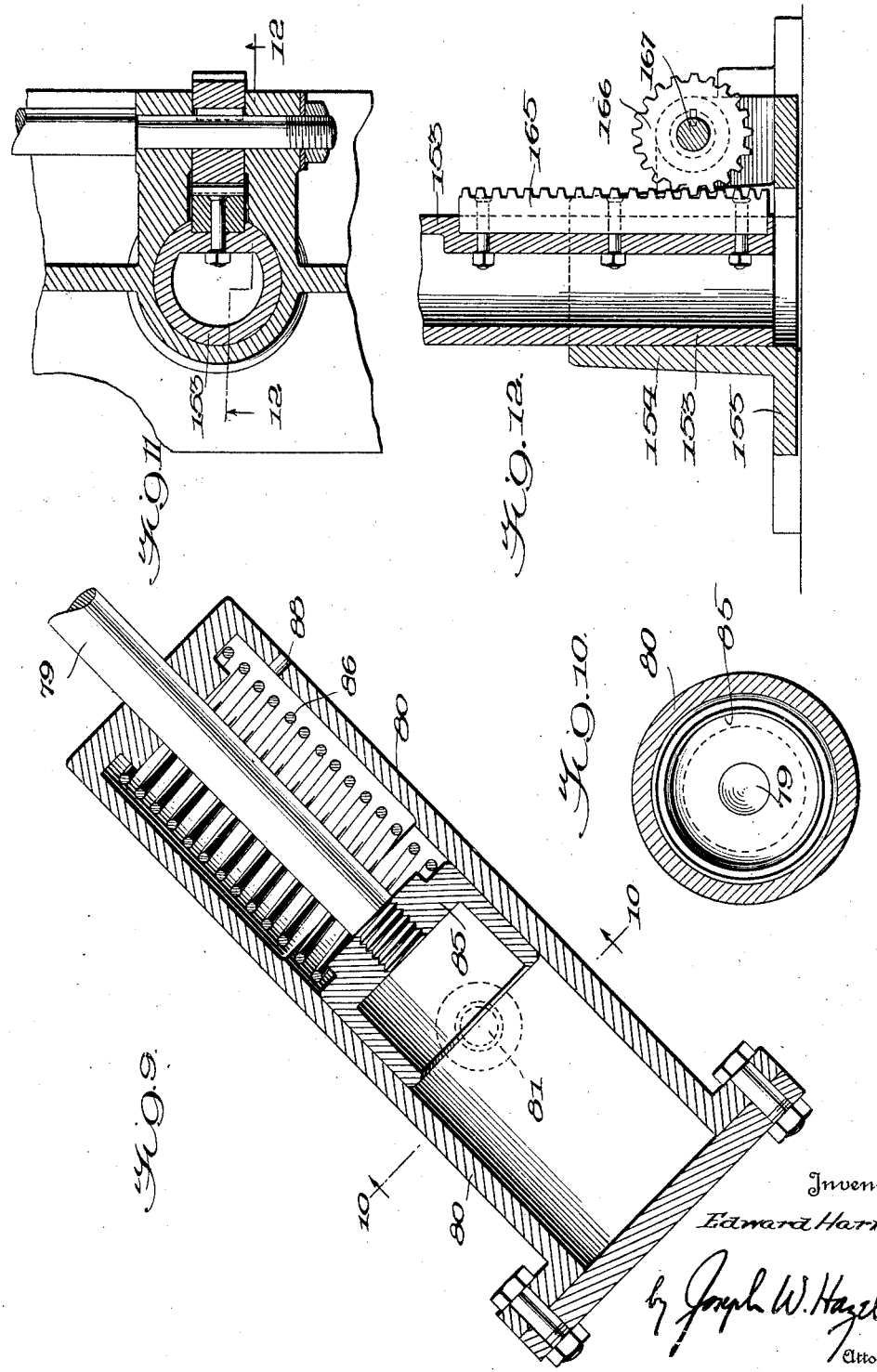

Patented Aug. 27, 1929.

1,726,025

UNITED STATES PATENT OFFICE.

EDWARD HARMES, OF WILKINSBURG, PENNSYLVANIA, ASSIGNOR TO NEW PROCESS MULTI-CASTINGS COMPANY, A CORPORATION OF NEW JERSEY.

MOLDING MACHINE.

Application filed April 9, 1927. Serial No. 182,262.

The present invention relates to foundry molding machines, and particularly to such machines provided with a flask, and manually operated, as distinguished from larger machines operated by power such as compressed air.

An object of the invention is to provide a relatively light, easily portable molding machine of this type with improved counterbalancing means, readily variable to suit varying conditions, and whereby the efficiency and ease of operation of the machine may be effectively increased.

Another object is to provide such a molding machine with an attached flask, and with roll-over, pattern drawing and flask stripping mechanism, whereby the machine may turn out any desired number of finished molds, ready for pouring, from a single flask.

Still another object of the invention is to include in such a machine means for moving the parts in a straight vertical path to insure maximum efficiency in drawing the pattern and in closing and stripping the mold.

A further object is to provide novel positioning and locking mechanism, for accurately positioning and holding the parts in certain positions, together with novel counterweight control means for throwing the counterweights into or out of operation as may be desired.

Still further objects and advantages of the invention will appear from the following description, taken in connection with the accompanying drawings, which illustrate, by way of example, a preferred embodiment of the invenion, and in which:

Fig. 3 is a rear end elevation of the machine of Fig. 1;

Fig. 4 is a top plan view thereof;

Fig. 5 is a sectional elevation taken substantially on the line 5—5 of Fig. 4, and partly broken away;

Fig. 6 is an enlarged sectional elevation through a portion of the flask arm and counterweight supporting means;

Fig. 7 is a fragmentary end elevation of the counterweight and its associated mechanism;

Fig. 8 is a fragmentary perspective view of the counterweights and associated control mechanism;

Fig. 9 is an enlarged longitudinal sectional view through one of the dash pot mechanisms;

Fig. 10 is a sectional view thereof taken substantially on line 10—10 of Fig. 9;

Fig. 11 is a slightly enlarged horizontal sectional view through a portion of the table actuating mechanism;

Fig. 12 is a vertical sectional view thereof taken substantially on the line 12—12 of Fig. 11.

Figure 1:
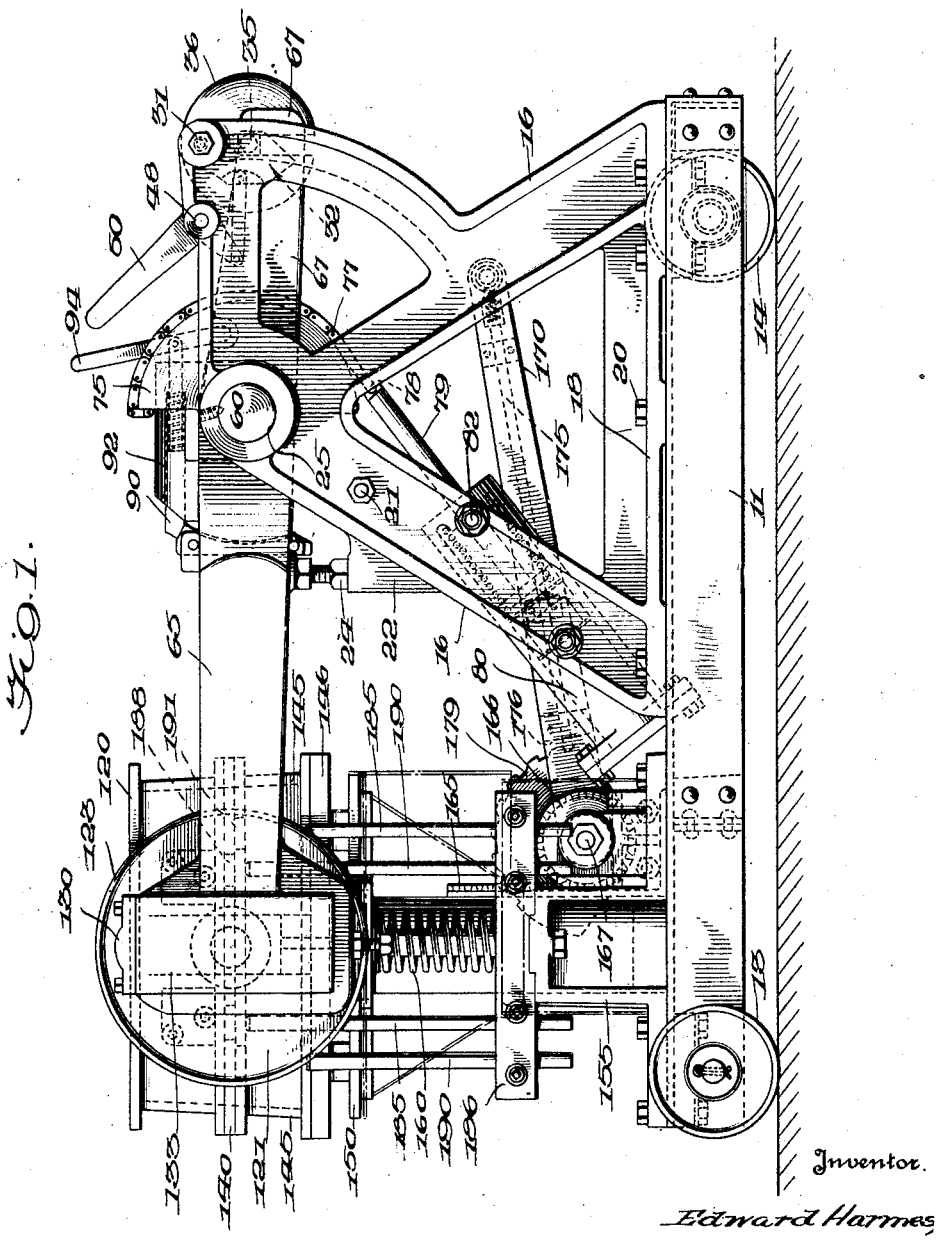
Fig. 1 is a side elevation of a machine embodying the present invention.
Figure 2:
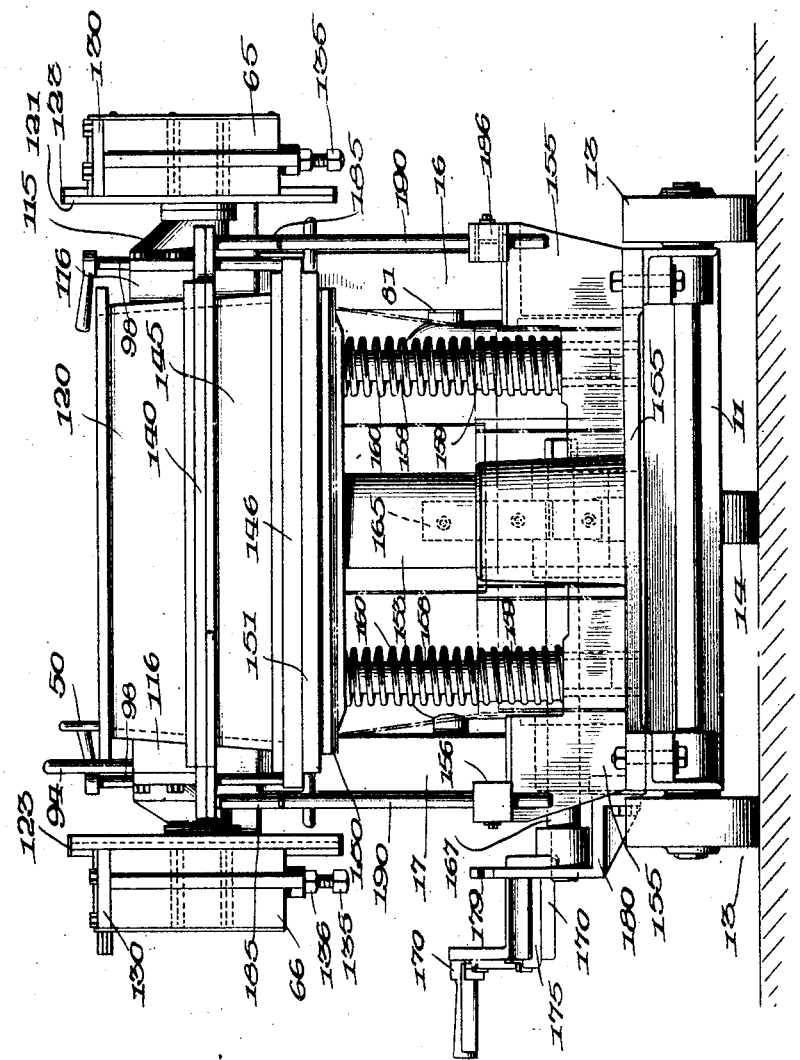
Fig. 2 is a front end elevation thereof.

Referring in detail to the embodiment of the invention illustrated in the accompanying drawings, the invention is preferably so constructed as to be easily portable, and for this purpose the base frame 11 is shown as being provided with front wheels 13 and a rear wheel 14.

Mounted on the base frame 11 are a pair of flask arm supporting brackets 16 and 17, here shown as being substantially triangular and having their bases 18 secured by bolts 20 or otherwise to the base frame 11. The flask arm supporting brackets 16 and 17 are connected by a bracing rod 21, and are each provided, in the present embodiment, at their forward ends, with a stop carrying lug 22, in which is threaded the variably positionable stop bolt 23, whose head is adapted to cooperate with and support the flask arms in their lowered position. The stop bolts 23 are clamped in adjusted position by any suitable locking means such as the lock nuts 24.

The invention provides means for counterbalancing the weight of a flask, and also provides means associated therewith for rendering said counterbalancing means operative or inoperative, according to the weight to be counterbalanced.

As here embodied, the flask arm supporting brackets 16 and 17 are further provided at their upper ends with flask arm supporting shaft bearings 25 and with rearwardly extending, substantially horizontal arms 29 and 30, pivotally carrying at 31 on their inner faces the counterweight supporting latches 32 and 33, which are adapted at times to support the projecting ends of the counterweight rod 35 extending between stationary arms 29 and 30 and carrying removable counterweights 36, and at times to release said rod and counterweights for cooperation with the flask arms hereinafter described. The actuating means for the latches 32 and 33 is here shown (Fig. 6) as including links 38 and 39 pivotally connected at 41 with their respective latches and having their other ends pivotally connected at 43 with actuating arms 46 fixed to an actuating shaft 48 rotatably mounted at its ends in the fixed arms 29 and 30, and provided at one end with the actuating lever handle 50. The weight of the latches 32 and 33 tends to maintain them normally in the position of Fig. 6; they are actuated by lever handle 50 to release the counterweights, and, by means of their cam surfaces 52, are engaged and cammed pivotally to the left (as viewed in Fig. 6) by the ends of the counterweight rod 35 as the latter moves upwardly from its position below the latches as hereinafter described.

Means are provided by the invention for supporting a flask attached to the machine, and, associated therewith, means permitting tilting of the flask supporting means, and, cooperating therewith, means for holding said flask supporting means either in raised or lowered position.

For this purpose, in the form shown, carried by the shaft bearings 25 and 26, of the supporting brackets 16 and 17, is the flask frame shaft 60, which supports at 61 and 62 (Fig. 4), for partial rotation or angular movement, the flask arm frame 64, which is shown as being provided with the forwardly extending flask carrying arms 65 and 66 and with the rearwardly extending counterweight arms 67 and 68. The counterweight arms 67 and 68, in their normal position, lie between, adjacent and approximately parallel to the bracket arms 29 and 30, and at their outer ends are provided with the depressions 69 to receive the ends of the counterweight rod 35 and to support and carry said rod and counterweights when this mechanism is released by the latches 32 and 33 hereinabove described.

Associated with the flask supporting means, the invention provides mechanism for permanently and yieldably counterbalancing the weight of the flask and flask supporting means, and also for insuring a steady and even motion of the parts.

Accordingly, as shown in the present embodiment of the invention, the counterweight arms 67 and 68 are also, and preferably adjacent the shaft 60, provided with the segments 75 and 76 fixed to said arms and to the upper portions of which are fixed the ends of flexible connecting members 77, whose intermediate portions normally lie along the curved faces of said segments and whose lower ends are pivotally connected at 78 with the piston rods 79 of dash pot mechanisms.

As here embodied, each dash pot mechanism includes a fixed cylinder 80, secured at 81 and 82 to the inner face of one of the flask arm supporting brackets. Each cylinder 80 (Fig. 9) is shown as being closed at both ends, and having in its upper end closure a central passage for the piston rod 79 of the piston 85. A coil compression spring 86 encircles the piston rod 79 and is normally in compression between the piston 85 and the upper end of the dash pot cylinder 80, which is provided, near said upper end, with a small air relief passage 88.

The invention provides means, as above stated, for holding the flask arms in horizontal or normal position, and also in elevated position after they have been moved angularly about the flask arm shaft 60.

As here embodied, said holding means is shown as comprising a spring pressed beveled latching detent 91, longitudinally reciprocable in a detent housing 92 fixed upon the upper portion of the bracket 17. An operating hand lever 94 for said detent is pivoted at 95 to the horizontal arm 30 of the bracket 17, and has a pin and slot connection at 96 with the detent 91. Cooperating with the detent 91 is a hardened steel shoe 97 secured rigidly to the flask arm frame 64, and having a concave face 99 and upper and lower beveled ends 100 and 101, respectively, cooperating with the beveled front end of the latching detent for holding the flask arm frame 64 either in lowered or elevated position.

The invention provides means for rotatably and adjustably supporting a molding flask in the forward ends of the flask arms 65 and 66, and as here embodied (see Fig. 5) each flask arm is provided near its outer end with a depression or vertically extending guideway 110, in which is mounted for vertical reciprocation a guide block 111. The guide block is provided with a bearing sleeve 112 to receive the rotatable stub shaft or trunnion 114 of a cope supporting bracket 115, to which is bolted or otherwise rigidly but detachably secured the cope securing bracket 116 of the cope 120.

To each of the trunnions 114 is secured a disc 121 carrying on its periphery the annular sand shedding guard 123, and one of said discs is provided on its outer face with a holding groove 125 extending diametrically thereacross, for engagement with a spring pressed positioning detent 126 reciprocably carried in a detent housing 127 of the guideway cap plate 130, and actuated by the lever handle 131 pivotally mounted on the side guideway closing plate 133. The positioning detent 126 is thus adapted, by cooperating with either end of the holding groove 125 of the rotatable disc 121, to maintain the flask either in upright or inverted position.

Each guide block 111 is preferably supported in the guideway 110 by a vertically adjustable supporting member, and for this purpose, in the form here shown, a vertically adjustable supporting bolt 135 is threaded into the lower portion of the flask arm and projects upwardly into the guideway 110, carrying upon its upper end the guide block 111, a lock nut 136 cooperating with the bolt 135 to maintain it in adjusted position.

A removable pattern plate 140 cooperates with the cope 120 and with the drag 145, these parts being provided preferably with the usual positioning pins, not shown, to insure accuracy and rigidity of assembly, and the drag 145 is shown as resting on the bottom board 146. These parts are releasably clamped in assembled position by any suitable form of flask clamps 98.

Means are provided by the invention for drawing the pattern in a straight vertical direction, and for closing the mold and stripping the flask by a similar movement of the parts.

For this purpose, in the present embodiment, a vertically movable operating table 150 is provided, having the table top 151, and carried by the vertically movable plunger 153, slidably mounted in the cylindrical guide flange 154 of the forward fixed frame 155 bolted or otherwise rigidly secured upon the base frame 11, the plunger and guide flange being protected from sand by sand guards 156 and 157. Guide means are preferably provided for insuring true rectilinear vertical movement of the operating table, and, in the form shown, for this purpose, guide rods 158 have their upper ends secured in the table 150, and reciprocate vertically therewith. The downwardly extending guide rods 158 are slidably received within, and guided by, guide sleeves 159 fixed in or forming a part of the forward fixed frame 155, and, for the purpose of exerting yielding upward pressure on the table 150, coil springs 160 are shown as encircling said guide rods and being in compression between the frame 155 and the under side of the table top.

The invention provides means for raising and lowering the table 150, and, as here shown, this means includes a vertical rack 165 secured upon the table plunger 153, a suitable rack opening being provided in the plunger guide flange 154, to permit a pinion 166 to mesh with said rack. The pinion 166 is fixed on a shaft 167 rotatably mounted in bearings 168 and 169 formed in or carried by the forward fixed frame 155. The shaft 167 is rotated to raise or lower the table 150 by a table raising and lowering lever handle 170, fixed on the outer end of said shaft, and with which cooperates the locking lever 175 of a spring pressed table holding detent 176, which rides on and engages with the ratchet teeth of a ratchet segment 179, formed integrally with or carried by a bracket 180 bolted or otherwise rigidly secured to the base frame 11. By means of the foregoing mechanism the table 150 may be raised or lowered, and also locked or releasably held in upper, lower, or intermediate position.

Means are provided by the invention for drawing the pattern upon downward movement of the table 50, and, as here embodied, vertically extending pattern drawing rods 185 are adjustably fixed in horizontal clamping brackets 186 mounted on the forward fixed frame 155. The upper ends of the pattern drawing rods are adapted to prevent the pattern plate 140 from moving downwardly, after the cope mold is clear of the cope pattern, by engaging with the pattern plate stop lugs 188 formed on the pattern plate 140 and located above the pattern plate drawing rods 185.

The invention also provides means, operable after the pattern has been drawn, the mold closed, and the cope mold stripped, for imparting an initial stripping movement to the drag flask, in a straight vertical direction, to release it from contact with the drag mold, after which the drag flask can be lifted off manually by the molder without danger of defacing the mold.

In the form shown, said means includes the drag stripping pins 190, extending vertically upwardly below the drag stripping lugs 191 formed on and extending laterally from the upper drag flange. The stripping pins 190 are preferably adjustably carried in the clamping brackets 186, hereinabove referred to. The upper ends of the stripping pins 190 are considerably below the upper ends of the drawing rods 185. In order to impart to the drag its initial stripping movement, the table 150 is lowered slightly beyond the point where the drag stripping lugs 191 contact with the upper ends of the stripping pins 190. The stripping pins hold the drag against further downward movement, and the additional downward movement of the table carries the mold downwardly out of contact with the drag. This movement is true straight line movement in a vertical direction, and insures that the mold will not be defaced in stripping the drag. The drag may then be lifted off by hand, but, since it is already clear of and spaced from the mold, precise rectilinear lifting of the drag by the molder is not required.

The operation of the machine is as follows:

Assuming the parts to be in the position of Fig. 1, with the pattern plate between the cope and drag, and with the counterweights 36 supported by latches 32 and 33, the flask assembly is inverted by releasing the flask positioning detent 126 and flask frame latching detent 91, tilting the flask arms upwardly, and rolling over the flask on trunnions 114, so that the open bottom end of the drag is uppermost, dash pots 80 counterbalancing the weight of the flask during the upward tilting of the flask arms. The parts are held in inverted position by detent 126, and in raised position by latching detent 91, which is now released, and the assembly lowered to the table. The drag is filled with sand, and rammed. Surplus sand is struck off, and the bottom board placed on the filled drag and clamped in position by the flask assembling clamps. The flask assembly is then rolled over to upright position by tilting the flask arms upwardly, releasing detent 126 and rolling over as before, except that, to aid in counterbalancing the heavier load, lever 50 is first actuated to release the counterweights 36, so that these counterweights will be carried downwardly by the flask frame counterweight arms 67 and 68, as the flask arms 65 and 66 are tilted upwardly.

When the flask assembly has been rolled over to upright position, the flask is again lowered so that the bottom board 146 rests on the operating table, and during this lowering movement of the flask arms, the rearwardly extending counterweight arms 67 and 68 will be raised, carrying upwardly the counterweights 36 on counterweight rod 35, which rides past the counterweight supporting latches 32 and 33, engaging the cam surfaces 52 and camming said latches to the left, as viewed in Fig. 6, until the counterweight rod 35 moves upwardly far enough to permit the latches to assume again their normal position, under the action of gravity, in which position they will support the counterweights 36 the next time the flask frame 64 is tilted, unless said latches are again released by actuating lever 50.

The cope 120 is now filled and rammed, and the pattern drawn by releasing the flask assembling clamps and lowering the table 150 by lever 170 until the pattern drawing lugs 188 rest on the rods 190. This movement starts the draw of the cope pattern, and permits the cope to be tilted upwardly to clear the cope mold of the pattern plate without danger of defacing the mold. Continued downward movement of the table 150 leaves the pattern plate resting on rods 190, and lowers the drag and drag mold away from the pattern plate, so that the pattern plate may be removed horizontally and the mold closed by lowering the cope and lifting the table to bring the two parts of the mold into contact. The sand retaining slides of the cope, which may be of any usual or convenient form and are not shown in the drawings, are now released, and the table lowered to strip the cope off the cope mold. Continued downward movement of the table brings the drag stripping lugs 191 into contact with the stripping pins 190, and prevents further downward movement of the drag, but carries the assembled mold a short distance further downwardly, thereby starting the stripping of the drag, which may then be lifted off manually by the molder, the cope being tilted to raised position, if necessary for clearance, in which position it will be held by latching detent 91.

The complete mold may then be removed from the machine and provided with any suitable form of temporary slip-over jacket for pouring.

It will be seen that the foregoing construction provides a readily portable, light, hand operated molding machine capable of turning out any desired number of molds from a single flask attached to the machine; and provided with efficient counterbalancing means which are optionally operable to suit varying weights to be counterbalanced, together with releasing and supporting means therefor which do not require any weight lifting by the molder. It is also evident that smooth and steady operation is assured by the dash pot mechanism, and that the cope is automatically locked in raised or lowered position. It will likewise be evident that efficient, accurate and safe pattern drawing and flask stripping means have been provided, so that these operations may be carried out at increased speed without danger of defacing the mold.

What is claimed is:

1. In a molding machine, a two-part flask, carrying means therefor, means counterbalancing the weight of said flask when empty, additional means for counterbalancing said flask containing molding sand, and means for drawing a pattern from both flask parts.

2. In a molding machine, a two-part flask, carrying means therefor, flask counterbalancing means permanently associated with said flask carrying means, additional counterbalancing means carried by said molding machine and releasable for cooperation with said flask carrying means when weight is added to said flask, and means operable in one direction for drawing a pattern from both flask parts, and operable in the opposite direction to close a mold after said pattern has been drawn.

3. In a molding machine, a two-part flask, carrying means therefor, flask counterbalancing means permanently associated with said flask carrying means, additional counterbalancing means normally carried by said molding machine and releasable for cooperation with said flask carrying means, means for transferring the weight of said additional counterbalancing means from said molding machine to said flask carrying means in counterbalancing relation therewith, means operable in one direction for drawing a pattern from both flask parts and operable in the opposite direction to close a mold after said pattern has been drawn, and means for stripping both flask parts off their respective assembled molds.

4. In a molding machine, a two-part flask, carrying means therefor, means for rolling over both parts of said flask with a pattern plate assembled therebetween, flask counterbalancing means normally supported in inoperative position by said molding machine and releasable for cooperation with said flask carrying means, and means for transferring said counterbalancing means from said molding machine into counterbalancing cooperation with said flask carrying means.

5. In a molding machine, a two-part flask, carrying means therefor including pivotally mounted flask supporting arms, means for rolling over both parts of said flask with a pattern plate assembled therebetween, counterweights for said flask, supporting means for said counterweights normally holding said counterweights in inoperative position, means for transferring said counterweights from said supporting means into counterbalancing cooperation with said pivotally mounted flask supporting arms, and means for separating said flask parts from each other and for closing a two-part mold.

6. In a molding machine, a flask, a pair of pivotally mounted flask carrying arms, means associated with said arms for counterbalancing and steadying the movement of said flask and arms, locking means releasably holding said flask in elevated or lowered position, additional counterbalancing means for said flask and arms, control means for bringing said additional counterbalancing means into cooperating counterbalancing relation with said flask carrying arms, and means actuated by lowering said flask for relieving said arms from counterbalancing cooperation with said additional counterbalancing means.

7. In a molding machine, a flask, vertically, angularly movable carrying means therefor, counterbalancing mechanism for said flask, latching means normally holding said counterbalancing mechanism out of cooperating relation with said flask carrying means, and means for bringing said counterbalancing mechanism into cooperating counterbalancing relation with said flask carrying means, said latching mechanism being operated by lowering movement of said flask to terminate the counterbalancing cooperation of said counterbalancing mechanism with said flask carrying means.

8. In a molding machine, a flask including a cope and drag, means for stripping said cope from a cope mold, and means operable on downward movement after said cope is stripped for imparting an initial stripping movement to the drag with respect to a drag mold.

9. In a molding machine, a flask including a cope and drag, means for stripping said cope from a cope mold including vertically movable mold supporting means, and means including relatively stationary drag stripping members operable after said cope is stripped for imparting an initial stripping movement to said drag with respect to a drag mold.

10. In a molding machine, a flask including a cope and drag, means for stripping said cope from a cope mold including vertically rectilinearly movable mold supporting means and cooperating vertically angularly movable cope supporting means, means including relatively stationary drag stripping members operable after said cope is stripped for imparting an initial stripping movement to said drag with respect to a drag mold, and means associated with said cope supporting means for steadying vertical angular movement of said cope.

11. In a molding machine, a flask including a cope and drag, means for stripping said cope from a cope mold including vertically rectilinearly movable mold supporting means, means including relatively stationary drag stripping members operable after said cope is stripped for imparting an initial stripping movement to said drag with respect to a drag mold, counterbalancing means for said flask, and mechanism normally holding said counterbalancing means out of counterbalancing relation with said flask, and operable to bring said counterbalancing means into counterbalancing relation therewith.

12. In a molding machine, a flask including a cope and drag, means for stripping said cope from a cope mold including vertically rectilinearly movable mold supporting means and cooperating vertically angularly movable cope supporting means, means including relatively stationary drag stripping members operable after said cope is stripped for imparting an initial stripping movement to said drag with respect to a drag mold, counterbalancing means for said flask, mechanism normally holding said counterbalancing means out of counterbalancing relation with said flask, and operable to bring said counterbalancing means into counterbalancing relation therewith, and means associated with said cope supporting means for steadying vertical angular movement thereof.

13. In a molding machine, a flask including a cope and drag, means for stripping said cope from a cope mold including vertically rectilinearly movable mold supporting means and cooperating vertically angularly movable cope supporting means, means including relatively stationary drag stripping members operable after said cope is stripped for imparting an initial stripping movement to said drag with respect to a drag mold, counterbalancing means for said flask, mechanism normally holding said counterbalancing means out of counterbalancing relation with said flask, and operable to bring said counterbalancing means into counterbalancing relation therewith, means associated with said cope supporting means for steadying vertical angular movement thereof, and mechanism associated with said cope supporting means for releasably holding said means in raised or lowered position.

In testimony whereof I affix my signature.

EDWARD HARMES.